(12) United States Patent
Hollister et al.

(10) Patent No.: US 6,625,354 B2
(45) Date of Patent: Sep. 23, 2003

(54) FIBER AMPLIFIER HAVING A PRISM FOR EFFICIENT COUPLING OF PUMP ENERGY

(75) Inventors: Jack H. Hollister, Chesterfield, MO (US); Robert R. Rice, Simi Valley, CA (US); Neil F. Ruggieri, St. Louis, MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/740,370

(22) Filed: Dec. 19, 2000

(65) Prior Publication Data

US 2002/0076153 A1 Jun. 20, 2002

(51) Int. Cl.[7] .......................... G02B 6/43; H04B 10/12; H01S 3/067
(52) U.S. Cl. ............................. 385/36; 385/32; 372/6; 359/341.1; 359/341.3
(58) Field of Search ................ 385/30–32, 36, 385/123; 372/6, 20, 102; 359/341.1, 341.3

(56) References Cited

U.S. PATENT DOCUMENTS

| | | |
|---|---|---|
| 3,525,053 A | 8/1970 | Chernoch |
| 3,631,362 A | 12/1971 | Almasi |
| 4,233,567 A | 11/1980 | Chernoch |
| 4,413,879 A | 11/1983 | Berthold, III et al. |
| 4,872,747 A * | 10/1989 | Jalkio et al. ................ 359/669 |
| 5,037,172 A | 8/1991 | Hekman et al. |
| 5,553,088 A | 9/1996 | Brauch et al. |
| 5,846,638 A | 12/1998 | Meissner |
| 5,854,865 A | 12/1998 | Goldberg |
| 5,923,694 A * | 7/1999 | Culver .......................... 372/6 |
| 6,263,003 B1 * | 7/2001 | Huang et al. ............. 359/341.3 |
| 6,317,537 B1 * | 11/2001 | Ionov et al. .................... 372/6 |
| 6,462,864 B1 * | 10/2002 | Lange et al. ............. 359/341.1 |

FOREIGN PATENT DOCUMENTS

| | | |
|---|---|---|
| EP | 0 320 990 A2 | 6/1989 |
| EP | 0 933 841 A2 | 8/1999 |
| WO | WO 98/36477 A1 | 8/1998 |

* cited by examiner

Primary Examiner—Hemang Sanghavi
Assistant Examiner—Omar Rojas
(74) Attorney, Agent, or Firm—Alston & Bird LLP

(57) ABSTRACT

An optical fiber amplifier employing a prism to optimally couple pump energy into the pump core of a dual clad fiber. The optical fiber amplifier consists of a dual clad fiber having an inner (e.g., signal) core, an outer (e.g., pump) core surrounding the inner core, and a cladding layer at least partially surrounding the outer core. Pump energy can be injected into the outer core through the prism located adjacent to the outer core in order to amplify signals propagating through the inner core.

20 Claims, 9 Drawing Sheets

FIBER AMPLIFIER HAVING A PRISM FOR EFFICIENT COUPLING OF PUMP ENERGY

FIELD OF THE INVENTION

The present invention relates generally to optical fiber amplifiers and, more particularly, to techniques for coupling pump energy into the pump core layer of an optical fiber amplifier.

BACKGROUND OF THE INVENTION

Fiber amplifiers are commonly used in many applications, including telecommunications applications and high power military and industrial fiber optic applications. For example, both U.S. Pat. No. 5,946,130, issued Aug. 31, 1999 to Rice and U.S. Pat. No. 5,694,408 issued Dec. 2, 1997 to Bott et al. describe many such applications in which fiber amplifiers are employed including the processing of materials, laser weapon and laser ranging systems, and a variety of medical and other applications.

Optical fiber amplifiers are designed to increase the power output levels of the signals propagating therealong. One conventional optical fiber amplifier design is an end pumped dual clad fiber. Referring to FIG. 1, the dual clad fiber 10 has a single mode signal core 12, a multi-mode pump core 14 surrounding the signal core, and an outer cladding layer 16 surrounding the pump core for confining pump energy within the pump core such that signals propagating through the signal core are amplified. The signal core will typically be doped with one or more rare earth elements such as, for example, ytterbium, neodymium, praseodymium, erbium, holmium or thulium. In operation pump energy is coupled into the pump core at the input end 18 of the fiber. The pump energy then propagates along through the pump core until it is absorbed by the dopant in the signal core, thus amplifying signals propagating through the signal core. Although dual clad fibers can have different sizes, one typical dual clad fiber includes a signal core that has a diameter of 8–10 μm and a pump core that has cross-sectional dimensions of 100–300 μm. End pumped dual clad fiber amplifiers of this size can typically reach fiber energy power levels of 115 W.

To allow the largest amount of pump energy as possible to be coupled into the end of the fiber, the size of the pump core is generally made as large as practical. The size of the pump core, however, is limited by the requirement to maintain a significant absorption of pump energy per unit length of fiber. While a design that introduces pump energy into the end of the fiber has led to great increases in output power levels, the practical limits have essentially been reached for pump arrays of typical power output. Facing this problem, a number of alternative pumping techniques have been developed. For example, U.S. Pat. No. 5,854,865 issued Dec. 29, 1998 to Goldberg discloses a fiber amplifier having a v-shaped notch cut into the pump core through the cladding layer. Pump energy can then be reflected or refracted from one of the angled faces of the v-shaped notch so as to be injected directly into the pump core. Another technique involves the use of a fiber amplifier having portions of the cladding and the pump core removed. The fiber amplifier is then spooled between two reflective elements and pump energy introduced into the region between the reflective elements. The pump energy is then repeatedly reflected by the reflective elements in order to amplify signals propagating through the signal core.

The current techniques, while achieving some level of success, also have their drawbacks. They can require extensive and tightly controlled processing. Also, they are generally not easily amenable to volume manufacturing and scaling. Thus, it would be advantageous to provide an inexpensive optical fiber amplifier with a relatively straightforward design that is capable of being fabricated in mass quantities while addressing each of the other aforementioned features.

SUMMARY OF THE INVENTION

An optical fiber amplifier is therefore provided that employs a prism to optimally couple pump energy into the pump core of a dual clad fiber. The optical fiber amplifier of the present invention consists of a dual clad fiber having an inner (e.g., signal) core, an outer (e.g., pump) core surrounding the inner core, and a cladding layer at least partially surrounding the outer core. Pump energy can then be injected into the outer core through the prism located adjacent to the outer core in order to amplify signals propagating through the inner core.

In one embodiment, the outer core, cladding layer, and the prism of the fiber amplifier are selected such that:

$$\alpha' > \theta_c$$

where $\alpha'$ is the angle of refraction of the pump energy at the prism-outer core interface and $\theta_c$ is the critical angle of incidence in the outer core with the cladding layer. The critical angle, $\theta_c$, is given by Snell's Law as:

$$\theta_c = \sin^{-1}[N_{cl}/N_p]$$

where $N_{cl}$ is a refractive index of the cladding layer and $N_p$ is a refractive index of the outer core. Calculating the acceptable angles of refraction, $\alpha'$, from the critical angle, $\theta_c$, the angle defined between a face of the prism through which the pump energy is injected and the surface of the outer core, $\alpha$, is given by Snell's Law as:

$$\alpha = \sin^{-1}[(N_p/N_{pr})*\sin \alpha']$$

where $N_{pr}$ is a refractive index of the prism.

The prism of the fiber amplifier includes a first face proximate the outer core, a second face extending at an acute angle $\alpha$ from one end of the first face through which pump energy is injected and a third face extending outwardly at an acute angle $\beta$ from another end of the first face. In one embodiment, the prism is selected such that angle $\alpha$ equals angle $\beta$ such that pump energy can be introduced into the outer core through both the second and third faces so as to propagate in opposite directions through the outer core.

In another embodiment, a reflective surface is located adjacent to the third face of the prism. The reflective surface reduces loss by redirecting pump energy that would otherwise escape through the prism back into the outer core. In one embodiment, the second face of the prism includes an integral lens, such as an integral cylinder lens. The integral lens can collimate and/or focus the pump energy into the prism. In another embodiment, the prism extends circumferentially about the outer core. In a further embodiment, the refractive index of the prism is greater than the refractive index of the cladding layer.

In yet another embodiment, the optical fiber amplifier consists of the dual clad fiber disposed, typically in a spooled arrangement, on a support, such as a heat sink. A prism extends across the fiber at two or more locations along the length of the fiber such that pump energy can be injected into the outer core at each of these locations in order to amplify signals propagating through the inner core. In the embodiment in which the dual clad fiber is spooled on the support, the prism can extend thereacross such that the prism is disposed proximate opposed portions of the dual clad fiber. The support can define a groove through which the fiber extends. The prism can then extend across the groove so as to overlie the fiber while resting on a portion of the support in the vicinity of the groove.

The optical fiber amplifier of the present invention therefore offers a relatively straightforward design that permits pump energy to be readily injected into the outer core and, in turn, absorbed into the inner core. Additionally, the optical fiber amplifier is capable of being fabricated in mass quantities utilizing conventional manufacturing processes, thus avoiding extensive and tightly controlled processing.

BRIEF DESCRIPTION OF THE DRAWINGS

Figure 1:
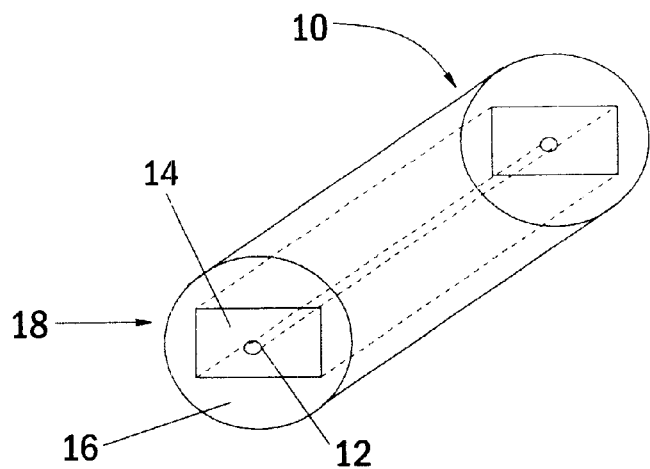
Figure 2:
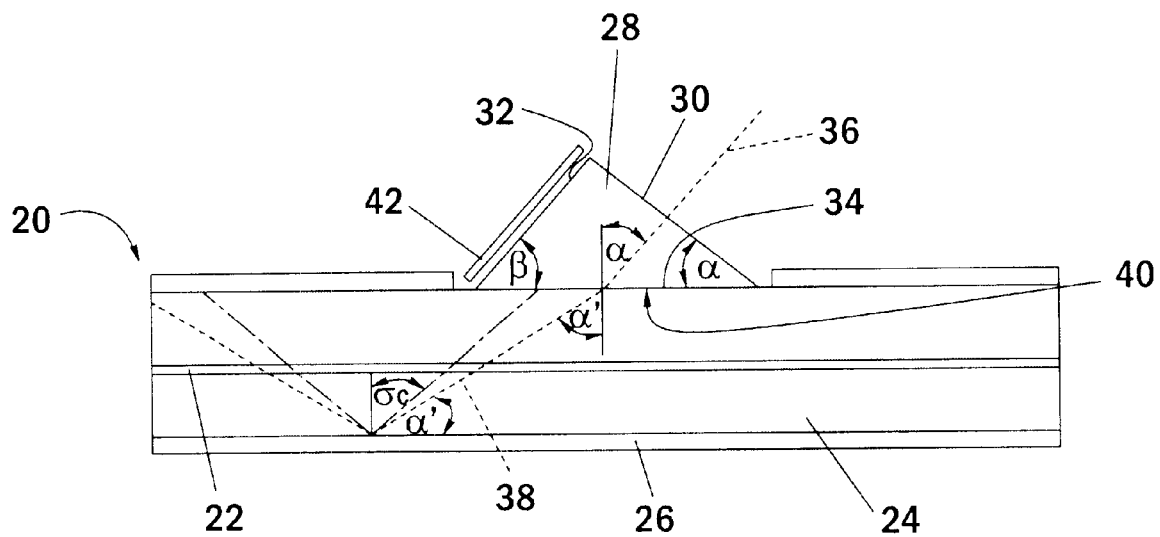
Figure 3:
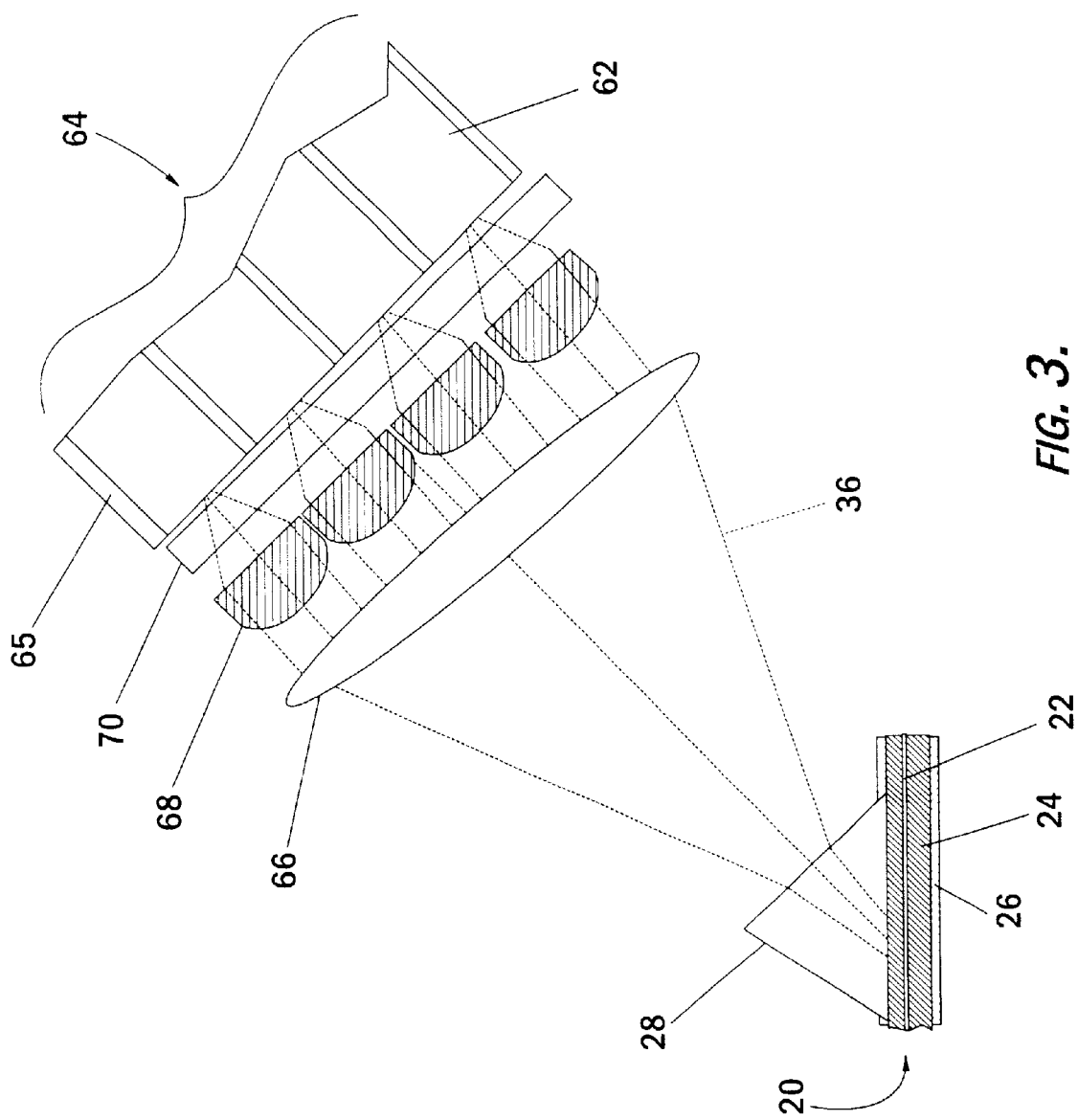
Figure 4:
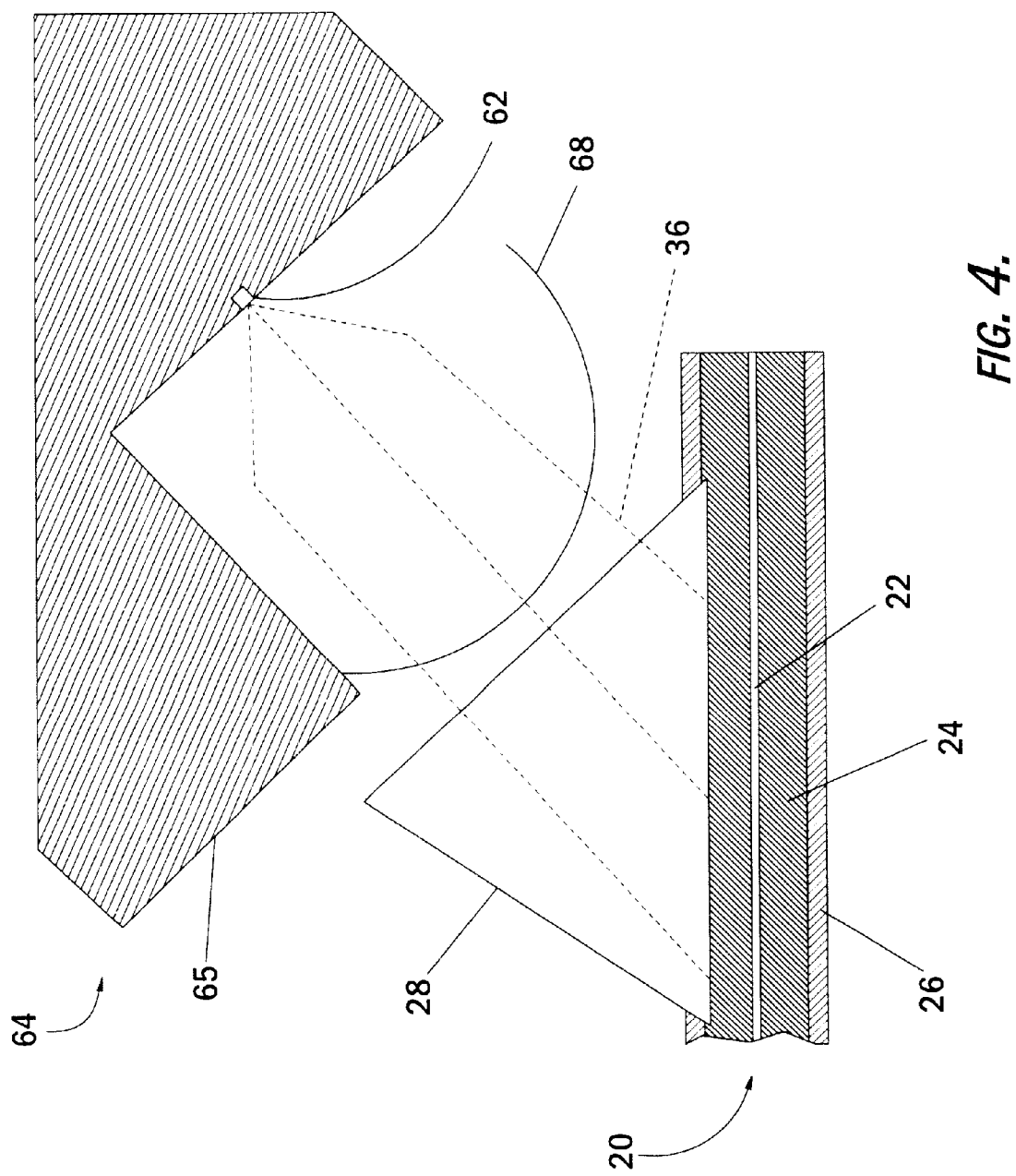
Figure 5:
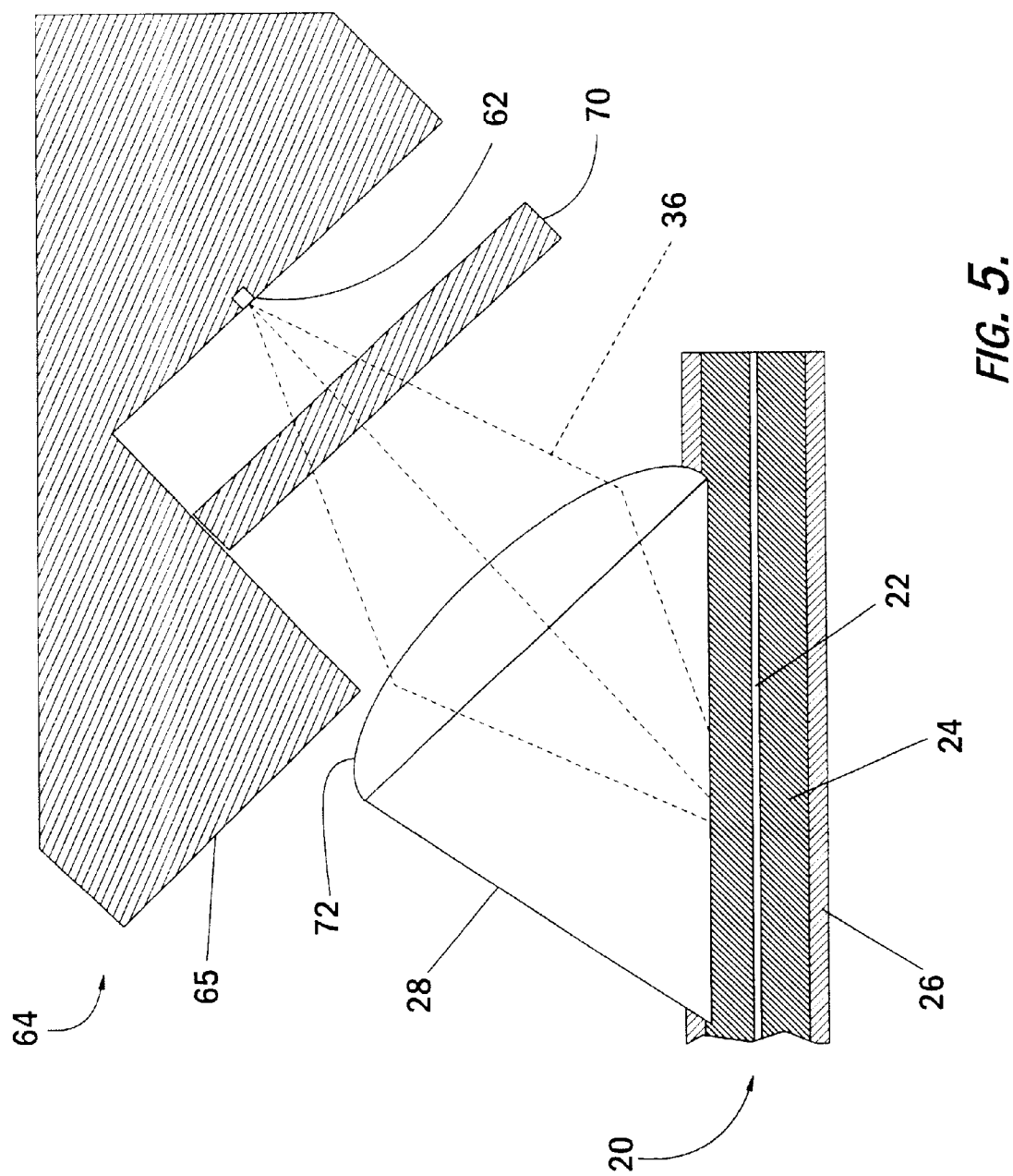
Figure 6:
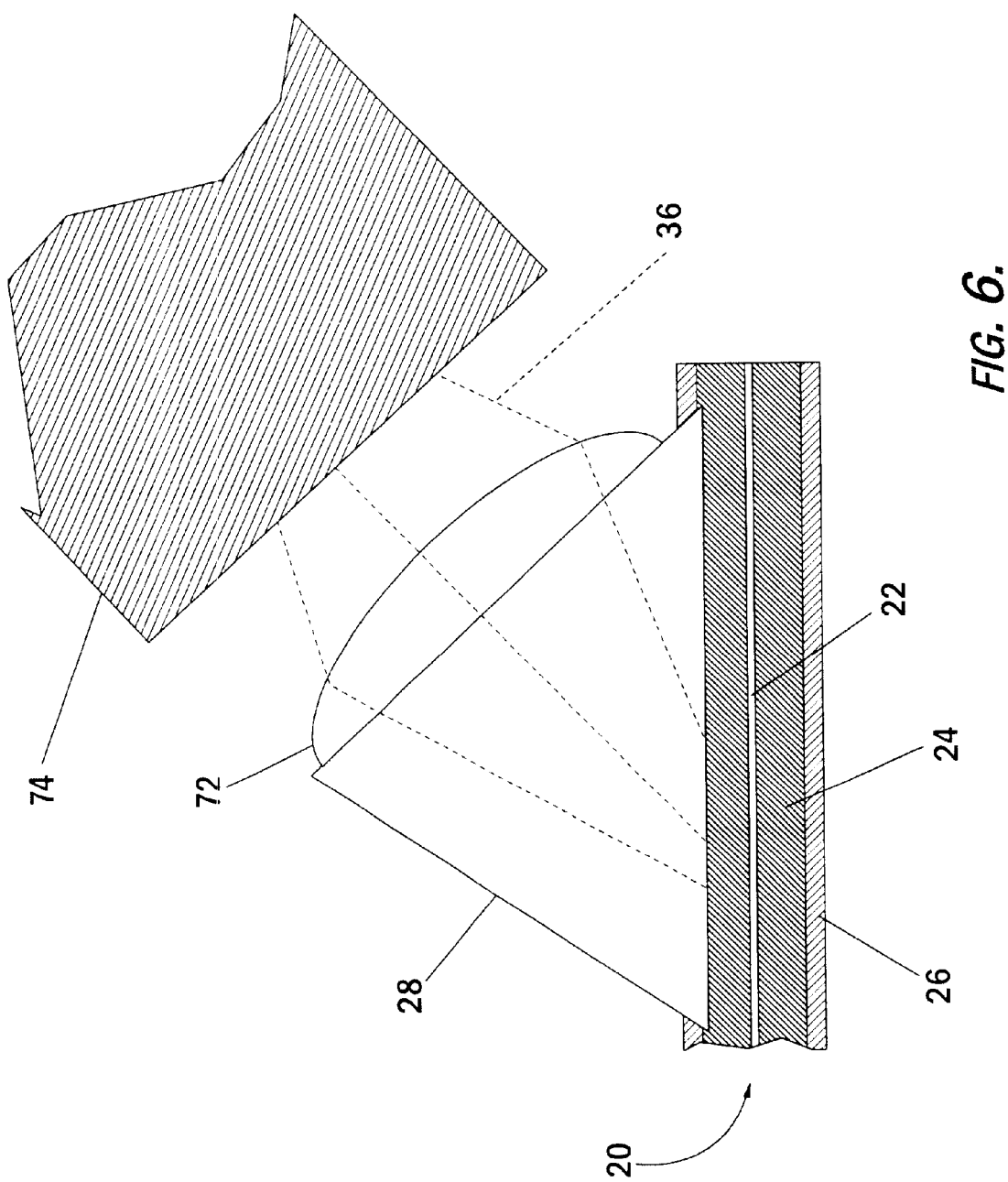
Figure 7:
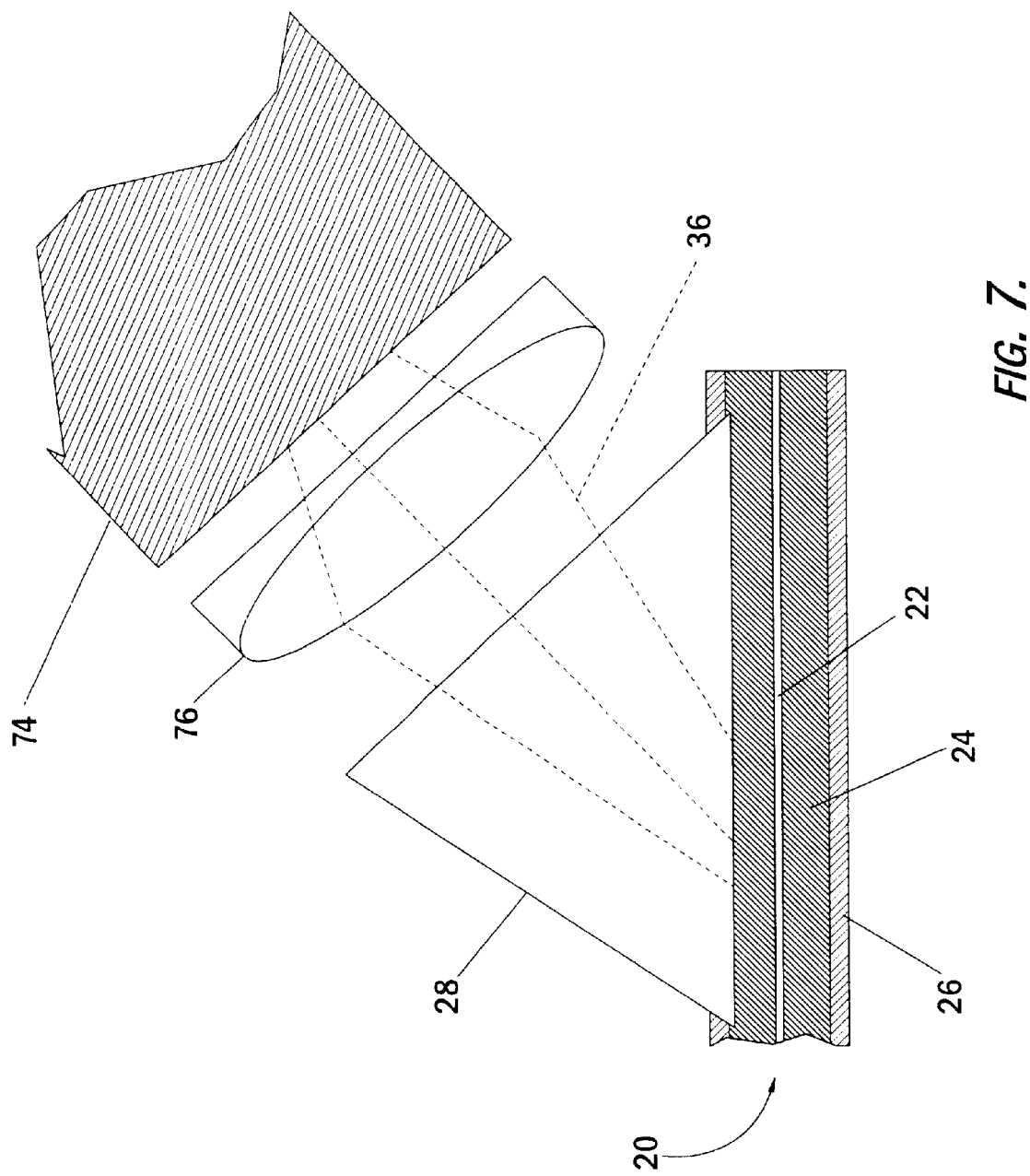
Figure 8:
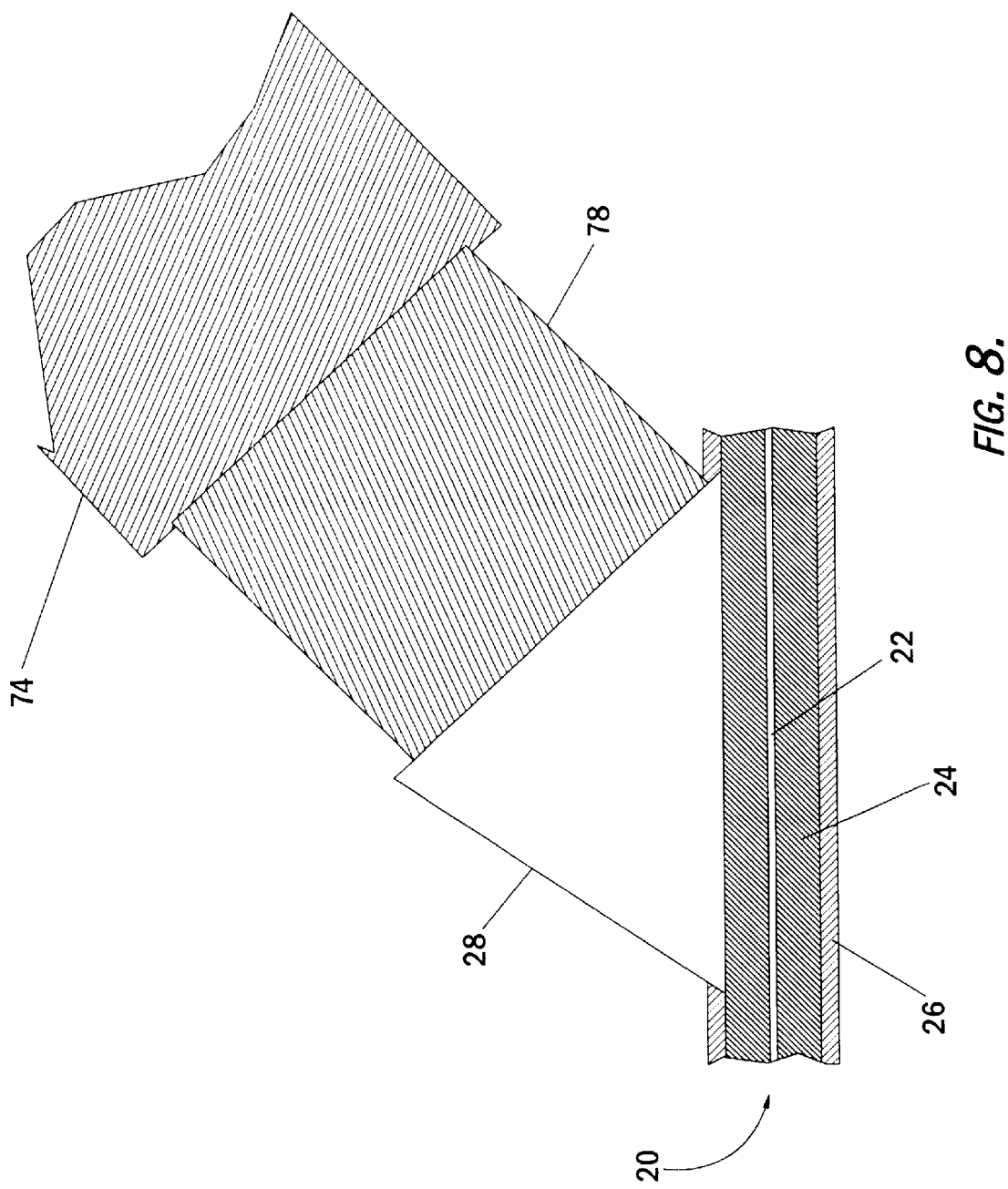
Figure 9:
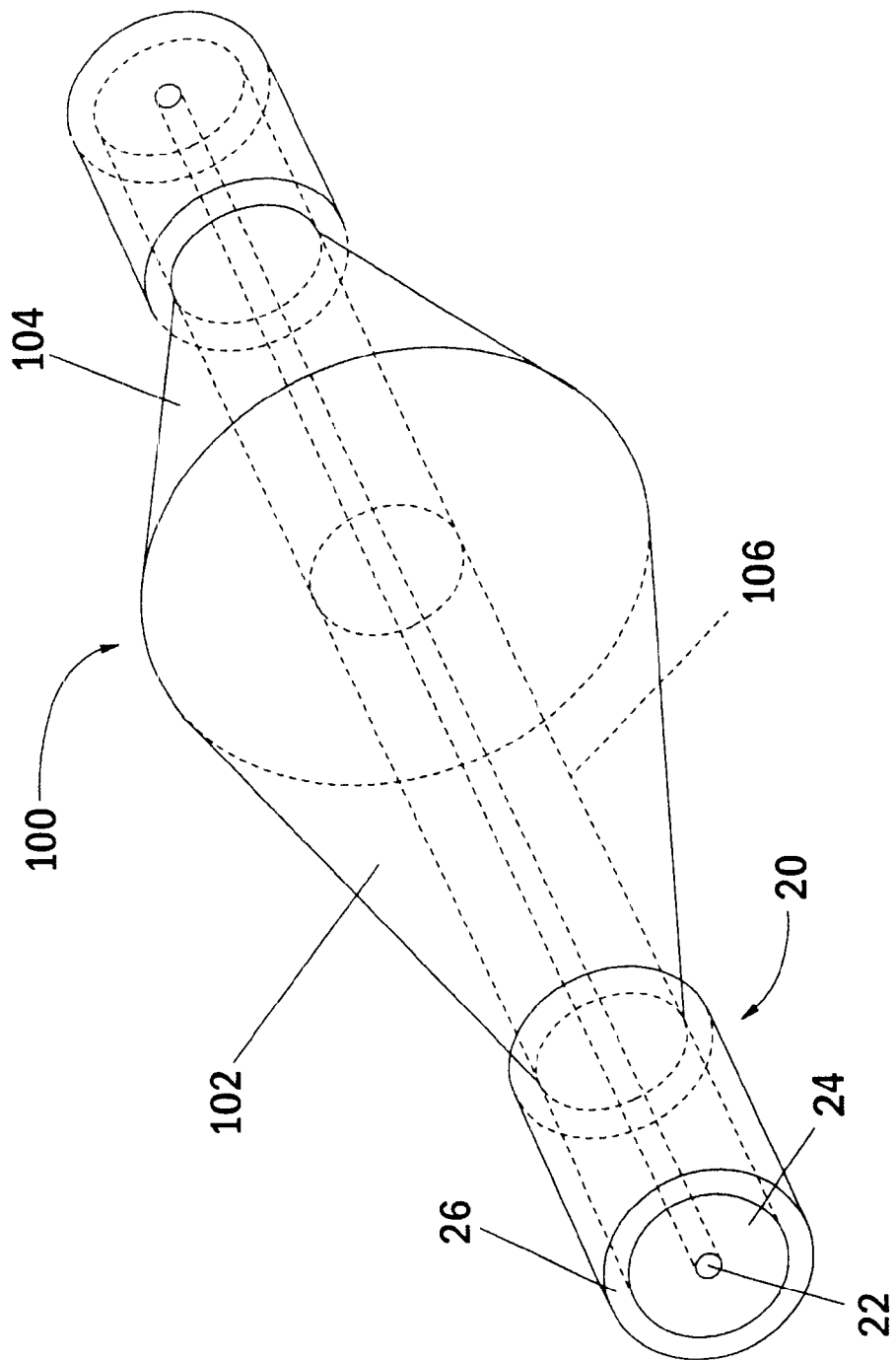
Figure 10:
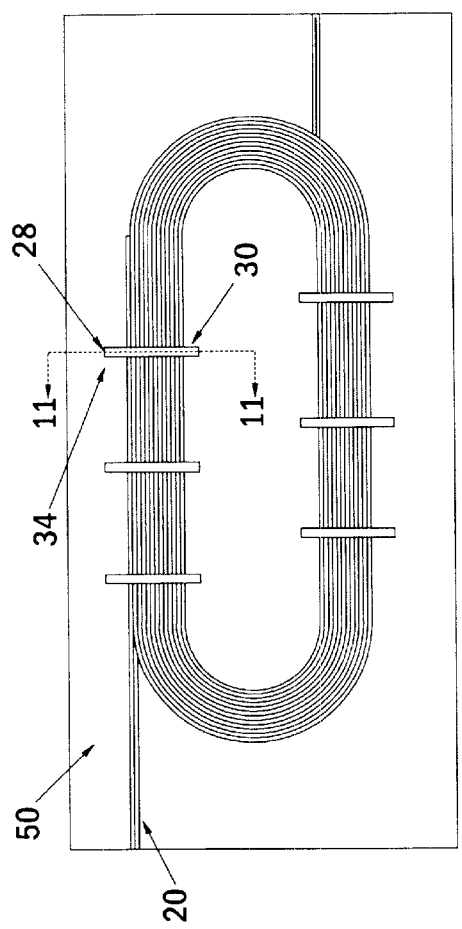
Figure 11:
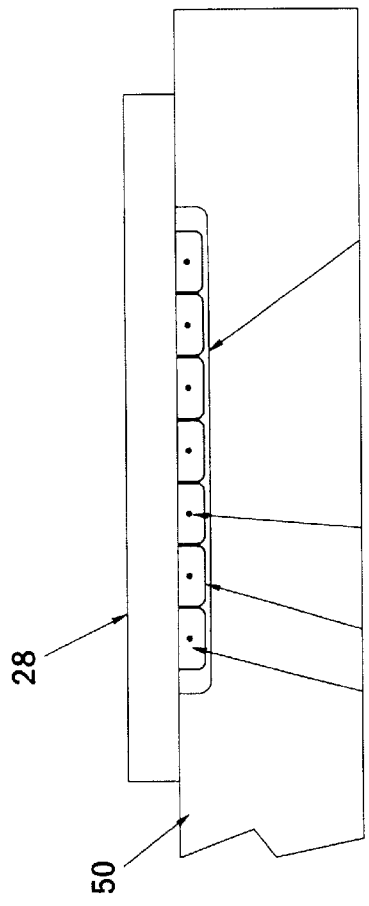

Having thus described the invention in general terms, reference will now be made to the accompanying drawings, which are not necessarily drawn to scale, and wherein:

FIG. 1 is an orthographic view of a conventional end pumped dual clad fiber;

FIG. 2 is a cross sectional view of one embodiment of a prism coupled optical fiber amplifier of the present invention;

FIG. 3 is a schematic side view of one embodiment of the present invention that includes a pump source comprised of multiple emitter laser diodes, and associated collimation and focus optics;

FIG. 4 is a schematic side view of one embodiment of the present invention that depicts the attachment of a collimation lens relative to a laser diode;

FIG. 5 is a schematic side view of one embodiment of the present invention including a prism having an integral cylinder lens and a pump source comprised of a laser diode;

FIG. 6 is a schematic side view of one embodiment of the present invention including a prism having an integral cylinder lens and a pump source that is coupled to the prism by means of a multi-mode fiber pig tail;

FIG. 7 is a schematic side view of one embodiment of the present invention in which the pump source is coupled to the prism by means of a multi-mode fiber pig tail and an aspheric high numerical aperture coupling lens;

FIG. 8 is a schematic side view of one embodiment of the present invention in which the pump source is coupled to the prism by means of a multi-mode fiber pig tail and a graded index lens;

FIG. 9 is an orthographic view of one embodiment of the present invention wherein the prism extends circumferentially about the outer core of the fiber amplifier;

FIG. 10 is a top elevational view of one embodiment of the present invention wherein the fiber amplifier is spooled on a support; and FIG. 11 is a cross sectional view of one embodiment of the present invention taken along line 11—11 of FIG. 10 wherein the fiber amplifier is extended through a groove defined by the support with the prism extended thereacross.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Reference is now made to the drawings, and in particular FIG. 2 which depicts a cross-sectional view of a prism coupled optical fiber amplifier 20 of one embodiment of the present invention. The fiber amplifier has a dual clad fiber that includes an inner core 22 doped with one or more rare earth elements such as, for example, ytterbium, neodymium, praseodymium, erbium, holmium or thulium. The inner core is designed to support the propagation and amplification of signals in a single mode and is therefore also known as a single mode signal core. The dual clad fiber of the fiber amplifier also has an outer core 24 at least partially surrounding the inner core. The outer core generally supports the propagation of multiple modes of pump signals and is therefore also known as a multi-mode pump core. In addition, the outer core is preferably designed to have a lower index of refraction $N_p$ than the inner core in order to confine the signals within the inner core. For example, both the inner and outer cores can be formed silica with the inner core doped with yermanium, in addition to a rare earth element, in order to have a greater refractive index $N_c$. The dual clad fiber of the fiber amplifier 20 also includes a cladding layer 26 that at least partially surrounds the outer core 24. While the cladding layer can be formed of various materials, the cladding layer is typically formed of a material, such as polymer, that has a refractive index $N_{cl}$ that is lower than the refractive index of the outer core. Additionally, the cladding layer can be formed of glass, as is currently being developed, without departing from the spirit and scope of the present invention. According to the present invention, the cladding layer defines at least one cladding opening 40 through which the outer core is exposed. Disposed within the cladding opening is a prism 28 that has a pump face 30, an exit face 32, and a support face 34. As shown in FIG. 2, the prism is positioned such that the support face is proximate the outer core, while the pump and exit faces extend outwardly therefrom. As also shown in FIG. 2, the pump face and support face define acute angle α, and the exit face and support face define acute angle β.

In operation, a diode laser pump source are injects pump rays 36 through the pump face of the prism and into the outer core for propagation lengthwise along the dual clad fibers, typically in a zig-zag fashion in which the pump energy is guided or constrained by the cladding layer. As known, the pump energy is at least partially absorbed by the inner core in order to amplify the signals propagating therethrough.

The pump energy can be provided by a variety of means. Referring to FIG. 3, for example, placed at a distance from the fiber amplifier 20, typically facing the pump face 32 of the prism 28, a diode laser pump source provides pump energy (generally depicted as pump rays 36) to the prism. The diode laser pump source can be any one of a variety of diode laser configurations, such as individual single emitter laser diodes 62, multiple emitter laser diodes 64 formed within a diode pump bar 65, or two-dimensional arrays of bars of multiple emitter laser diodes (not illustrated). To slow or halt the divergence of the pump rays 36, collimation optics can be disposed between the laser diodes and the prism. However, because the pump rays diverge at different rates from the laser diode 62 along the fast axis and the slow axis, two different collimation lenses are typically utilized, a fast axis lens 68 and a slow axis lens 70. Additionally, in order to focus the pump rays onto the prism, a focus lens 66 can be disposed between the laser diodes and the prism.

As stated above, spaced at a distance from the fiber amplifier 20, one or more laser diodes 62 can provide pump rays to the prism 28. As such, the distance between the laser diodes and the prism can vary. Set at a distance relatively close to the prism, as illustrated in FIG. 4, only collimation optics, such as a fast axis lens 68 and a slow axis lens 70 (not illustrated) may be required, with a focus lens 66 being unnecessary. As also shown in FIG. 4, the collimation optics can be attached to the body of the diode pump bar 65 so as to be aligned with a respective laser diode. The optical elements need not be discrete elements and can be integrated into the prism. In one embodiment, illustrated in FIG. 5, for example, the prism includes an integral cylinder lens 72 disposed on the face of the lens facing the emitter laser diode, typically the pump face 30. The integral cylinder lens takes the place of the fast axis lens and provides additional focus to the pump rays as they enter the prism.

The pump source need not be immediately adjacent to the prism 28. Instead, the pump source can be located some distance from the prism and fiber coupled to the prism, In this regard, a multi-mode fiber pig tail may be employed, such as those illustrated in FIGS. 6, 7 and 8. In multi-mode fiber pig tail configurations, the laser diodes are positioned at a remote location from the fiber amplifier 20 and a multi-mode pump coupling fiber 74 is disposed between the laser diodes and the fiber amplifier to guide the pump rays to the prism. As illustrated in FIG. 7, an aspheric high numerical aperture coupling lens 76 can be positioned between the pump coupling fiber and the prism to provide additional focus to the pump rays as they are directed to the prism. As shown in FIG. 8, a graded index lens 78 can, instead, be disposed between the pump coupling fiber and the prism. In this configuration, the index of refraction of the graded index lens can be tailored to collimate and/or focus the pump rays as they are directed to the prism.

Regardless of the type of pump source or the optics utilized to deliver the pump energy, the pump energy can impinge upon the pump face of the prism at any of a wide range of angles, but in the embodiment depicted in FIG. 2, the pump ray 36 enters the prism 28 through the pump face 30 at an angle normal to the surface of the pump face. The pump ray thus has an angle of incidence at the support face 34 equal to angle $\alpha$, and is refracted into the outer core 24 making an angle $\alpha'$ incident with the outer core. The prism and the outer core are preferably designed such that the refractive index $N_{pr}$ of the prism is greater than the refractive index $N_p$ of the outer core. As such, the pump rays are directed along the length of the dual clad fiber by reducing the angle between the pump rays and the longitudinal axis of the dual clad fiber.

Upon entering the outer core at an angle $\alpha'$ as shown in FIG. 2 the pump rays generally propagate both lengthwise along the dual clad fiber and laterally across the dual clad fiber until encountering the interface of the cladding layer and the outer core. In order to confine the pump energy within the outer core, the pump rays must reach the interface between the cladding layer and the outer core at an angle $\alpha'$ that is greater than a critical angle $\theta_c$ since pump rays striking the interface at an angle less than the critical angle $\theta_c$ will escape into the cladding layer. As such, angle $\alpha'$ must be greater than a critical angle $\theta_c$:

$$\alpha' > \theta_c \tag{1}$$

Using $N_{cl}$, the refractive index of the cladding layer 26, and the refractive index of the outer core, $N_p$, angle $\theta_c$ is given by Snell's Law as:

$$\theta_c = \sin^{-1}[N_{cl}/N_p] \tag{2}$$

Using the refractive index of the prism, $N_{pr}$, and the range of acceptable angles $\alpha'$ calculated from equations (1) and (2), angle $\alpha$ is given by Snell's Law as:

$$\alpha = \sin^{-1}[(N_p/N_{pr})*\sin \alpha'] \tag{3}$$

By determining the critical angle $\theta_c$ for a particular dual clad fiber, the range of acceptable interior angles $\alpha'$ and, in turn, the acceptable prism angles $\alpha$ can be readily determined. In operation the pump ray 36 propagates through the outer core 24 and is absorbed by the dopant in the inner core 22 to produce gain for the input signal propagating through the inner core. In order to improve the pumping or amplification, a fiber amplifier is typically pumped at a plurality of locations along the length of the optical fiber. As such, when the pump rays already in the outer core encounter a subsequent prism 28, some of the rays will leave the outer core and escape through the face 32 of the prism, thereby creating a loss for the fiber amplifier 20. To reduce the loss of pump rays from the fiber amplifier, the embodiment depicted in FIG. 2 includes a reflective surface 42 located adjacent to the exit face to provide back reflection of pump rays exiting the prism back into the fiber amplifier. Typically, the reflective surface is formed of a dielectric stack or a metal film and is coated onto the exit face of the prism. While the embodiment of FIG. 2 includes the reflective surface, it should be understood that the reflective surface is not necessary for operation of the fiber amplifier as the absorption of the pump rays by the inner core can be sufficient to amplify the input signals, even with partial loss of pump rays through the exit face of the prism. Alternatively, the fiber amplifier can be designed such that the pump energy input via a first prism is substantially dissipated, primarily due to absorption by the inner core, prior to reaching the subsequent prism such that little or no pump energy is available to escape through the subsequent prism.

In another embodiment in which a reflective surface 42 is not employed to provide back reflection, angle $\beta$, the angle between the exit face 32 and the support face 34 of the prism 28 can be set to equal to angle $\alpha$ to allow pump rays to enter the prism from both the pump face 30 and exit face. Thus, increased amounts of pump energy can be injected into the dual clad fiber to provide additional amplification. While it is advantageous in the embodiment in which pump energy is to be injected through both the pump and exit faces to design the prism such that $\alpha$ and $\beta$ are equal such that the pump energy propagates in the same manner in both directions along the fiber, the prism can be designed such that $\alpha$ and $\beta$ are different while still permitting the introduction of pump energy via both the pump and exit faces so long as both $\alpha$ and $\beta$ provide for corresponding interior angles $\alpha'$ and $\beta'$, respectively, that are greater than the critical angle $\theta_c$, as described above in conjunction with angle $\alpha$.

Referring to FIG. 9, in one embodiment of the present invention, the cladding layer 26 is removed in a circumferential way about all or at least a portion of the fiber amplifier 20, and the prism 100 extends circumferentially about all or at least a portion of the outer core 24 of the fiber amplifier. As before, the prism of this embodiment has a triangular shape in longitudinal cross-section, but instead of extending along only one side of the outer core, the prism extends circumferentially about the outer core. In this embodiment, the support face 106 of the prism has an arcuate shape while the pump face 104 and exit face 102 have frustum shapes. In this embodiment, the pump face and exit face extend outwardly from the support face at acute angles selected similarly to those selected above, wherein the pump face and support face define acute angle α and the exit face and support face define acute angle β. Also, while FIG. 9 depicts a single prism extending circumferentially about the outer core of the fiber amplifier, the fiber amplifier can include a single sector prism or even a multiple prisms, wherein the prisms each extend around a portion of the circumference of the outer core.

Referring now to FIG. 10, the fiber amplifier 20 of the illustrated embodiment is disposed in a spooled arrangement on a support 50 and is bonded thereto, typically by a thermally conductive adhesive. While the fiber amplifier is depicted in FIG. 10 in a spooled arrangement, such an arrangement is merely an illustrative example of one possible arrangement of the fiber amplifier, and many other arrangements of the fiber amplifier on the support are contemplated by the present invention. The support can be constructed from various materials, including those that act as a heat sink for the fiber amplifier, such as copper or silicon. In one advantageous embodiment, also depicted in FIG. 10, multiple prisms 28 extend across respective windings of the fiber amplifier to allow for distributed pumping of the fiber amplifiers, thereby enabling the amplifiers to operate a kilowatt levels while permitting the management of waste heat. In order to pump the fiber amplifier at a plurality of locations along its length, each prism preferably extends across several different windings of the fiber amplifier. In the embodiment of FIG. 10, for example, each prism extends across multiple windings of the fiber amplifier at a respective location to provide multiple points of entry for the pump ray 36 into the outer core 24. Using sources consisting of bar multiple emitter laser diodes 64 or two-dimensional dimensional arrays of bar multiple emitter laser diodes, the emitter laser diodes can be spaced at a predefined pitch relative to the fiber amplifiers 20, such as one laser diode per three fiber amplifiers.

With reference to FIG. 11, a cross sectional view of the embodiment of the fiber amplifier 20 illustrated in FIG. 10, the support 50 can define a groove 52, such as a spiral groove, through which the dual clad fiber extends. Preferably, the groove is sized such that the dual clad fiber can be completely seated and bonded therewithin so that the portion of the outer core 24 exposed by the cladding opening 40 is on the same plane as the surface of the support. The prism 28 can then be positioned across the groove so as to overlie the fiber amplifier while resting on a portion of the support. By appropriately sizing the groove, however, the support face of the prism will be proximate, if not in contact with, the dual clad fiber so as to facilitate the injection of pump signals at each of the plurality of positions along the length of the fiber.

The optical fiber amplifier 20 of the present invention therefore offers a relatively straightforward design that permits the pump ray 36 to be readily injected into the outer core 24 and, in turn, absorbed into the inner core 22. Also, the optical fiber amplifier can be mass produced by merely removing the cladding layer from one or more locations along the length of the fiber utilizing conventional manufacturing processes, thus avoiding extensive and tightly controlled processing.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fiber amplifier comprising:
   a longitudinally extending inner core;
   an outer core having a refractive index, said outer core surrounding said inner core and extending longitudinally therealong;
   a cladding layer at least partially surrounding said outer core, said cladding layer defining at least one opening through which said outer core is exposed; and
   at least one prism having a refractive index greater than that of said outer core, said at least one prism disposed within a respective opening defined by said cladding layer and extending laterally outward therefrom, said at least one prism extending circumferentially about said outer core.

2. A fiber amplifier according to claim 1 wherein said outer core, said cladding layer and said at least one prism are selected such that $$\alpha' > \theta_c$$

wherein α' is defined as $$\alpha' = \sin^{-1}[N_{pr}/N_p * \sin \alpha]$$

wherein $N_{pr}$ is a refractive index of said at least one prism, $N_p$ is a refractive index of said outer core and α is an angle defined between a face of said at least one prism through which a pump ray is injected and an outer surface of said outer core, and wherein $\theta_c$ is defined as $$\theta_c = \sin^{-1}[N_{cl}/N_p]$$

wherein $N_{cl}$ is a refractive index of said cladding layer.

3. A fiber amplifier according to claim 1 wherein said at least one prism comprises:
   a first face disposed proximate said outer core;
   a second face extending outwardly from one end of said first face at an acute angle α therefrom; and
   a third face extending outwardly from another end of said first face opposing said second face at an acute angle β from said first face, said acute angle β being equal to acute angle α.

4. A fiber amplifier according to claim 1 wherein said at least one prism comprises a first face disposed proximate said outer core, a second face through which a pump ray is injected, said second face extending outwardly from one end of said first face at an acute angle therefrom, and a third face extending outwardly from one end of said first face at an acute angle from said first face, and further comprising a reflective surface disposed proximate said third face.

5. A fiber amplifier according to claim 1 wherein said at least one prism comprises a first face disposed proximate said outer core, a second face extending outwardly from one end of said first face at an acute angle therefrom, and a third face extending outwardly from one end of said first face at an acute angle from said first face, and wherein said second face comprises an integral lens for directing pump rays entering said prism through said second face.

6. A fiber amplifier comprising:

a dual clad fiber comprising an inner core, an outer core surrounding said inner core, and a cladding layer at least partially surrounding said outer core; and at least one prism disposed proximate said dual clad fiber and extending outward therefrom such that pump energy can be injected into said outer core in order to amplify signals propagating through said inner core, said at least one prism extending circumferentially about said outer core, wherein said outer core, said cladding layer and said at least one prism are selected such that $\alpha' > \theta_c$ wherein $\alpha'$ is defined as $\alpha' = \sin^{-1}[N_{pr}/N_p * \sin \alpha]$ wherein $N_{pr}$ is a refractive index of said at least one prism, $N_p$ is a refractive index of said outer core, and $\alpha$ is an angle defined between a face of said at least one prism through which a pump ray is injected and an outer surface of said outer core, and wherein $\theta_c$ is defined as $\theta_c = \sin^{-1}[N_{cl}/N_p]$ wherein $N_{cl}$ is a refractive index of said cladding layer.

7. A fiber amplifier according to claim 6 wherein said at least one prism comprises:

a first face disposed proximate said dual clad fiber;

a second face extending outwardly from one end of said first face at an acute angle $\alpha$ therefrom; and a third face extending outwardly from another end of said first face opposing said second face at an acute angle $\beta$ from said first face, said acute angle $\beta$ being equal to acute angle $\alpha$.

8. A fiber amplifier according to claim 6 wherein said at least one prism comprises a first face disposed proximate said dual clad fiber, a second face through which a pump ray is injected, said second face extending outwardly from one end of said first face at an acute angle therefrom, and a third face extending outwardly from one end of said first face opposing said second face at an acute angle from said first face, and further comprising a reflective surface disposed proximate said third face.

9. A fiber amplifier according to claim 6 wherein said at least one prism comprises a first face disposed proximate said outer core, a second face extending outwardly from one end of said first face at an acute angle therefrom, and a third face extending outwardly from one end of said first face at an acute angle from said first face, and wherein said second face comprises an integral lens for directing pump rays entering said prism through said second face.

10. A fiber amplifier according to claim 6 wherein $N_{pr} > N_{cl}$ wherein $N_{pr}$ is a refractive index of said at least one prism, and $N_{cl}$ is a refractive index of said cladding layer.

11. A fiber amplifier assembly comprising:

a support;

a dual clad fiber disposed upon said support, said dual clad fiber comprising an inner core, an outer core having a refractive index and surrounding said inner core, and a cladding layer at least partially surrounding said outer core; and at least one prism having a refractive index greater than the refractive index of said outer core, said at least one prism disposed proximate said dual clad fiber at at least two locations along a length of said dual clad fiber such that pump energy can be injected into said outer core at each of the at least two locations in order to amplify signals propagating through said inner core.

12. A fiber amplifier assembly according to claim 11 wherein said outer core, said cladding layer and said at least one prism are selected such that $\alpha' > \theta_c$ wherein $\alpha'$ is defined as $\alpha' = \sin^{-1}[N_{pr}/N_p * \sin \alpha]$ wherein $N_{pr}$ is a refractive index of said at least one prism, $N_p$ is a refractive index of said outer core and $\alpha$ is an angle defined between a face of said at least one prism through which a pump ray is injected and an outer surface of said outer core, and wherein $\theta_c$ is defined as $\theta_c = \sin^{-1}[N_{cl}/N_p]$ wherein $N_{cl}$ is a refractive index of said cladding layer.

13. A fiber amplifier assembly according to claim 11 wherein said at least one prism comprises:

a first face disposed proximate said outer core;

a second face extending outwardly from one end of said first face at an acute angle $\alpha$ therefrom; and a third face extending outwardly from another end of said first face opposing said second face at an acute angle $\beta$ from said first face, said acute angle $\beta$ being equal to acute angle $\alpha$.

14. A fiber amplifier according to claim 11 wherein said at least one prism extends circumferentially about said outer core.

15. A fiber amplifier assembly according to claim 11 wherein said at least one prism comprises a first face disposed proximate said dual clad fiber, a second face through which a pump ray is injected, said second face extending outwardly from one end of said first face at an acute angle therefrom, and a third face extending outwardly from one end of said first face opposing said second face at an acute angle from said first face, and further comprising a reflective surface disposed proximate said third face.

16. A fiber amplifier according to claim 11 wherein said at least one prism comprises a first face disposed proximate said outer core, a second face extending outwardly from one end of said first face at an acute angle therefrom, and a third face extending outwardly from one end of said first face at an acute angle from said first face, and wherein said second face comprises an integral lens for directing pump rays entering said prism through said second face.

17. A fiber amplifier assembly according to claim 11 wherein said dual clad fiber is spooled upon said support, and wherein said at least one prism extends across said spooled dual clad fiber such that said at least one prism is disposed proximate opposed portions of said dual clad fiber.

18. A fiber amplifier assembly according to claim 11 wherein said support comprises a heat sink member.

19. A fiber amplifier assembly according to claim 11 wherein said support defines at least one groove, and wherein said dual clad fiber is at least partially disposed within said at least one groove.

20. A fiber amplifier assembly according to claim 19 wherein said at least one prism overlies said dual clad fiber and rests on that portion of said support that defines the at least one groove in which said dual clad fiber is disposed.

* * * * *